US 11,474,585 B2

(12) United States Patent
Zhang et al.

(10) Patent No.: US 11,474,585 B2
(45) Date of Patent: Oct. 18, 2022

(54) WAKE-UP CONTROL METHOD AND DEVICE FOR BODY CONTROL MODULE

(71) Applicant: Guangzhou Automobile Group Co., Ltd., Guangdong (CN)

(72) Inventors: Wenlong Zhang, Guangdong (CN); Shaotang Huang, Guangdong (CN); Zhide Zhang, Guangdong (CN); Guangwei Ran, Guangdong (CN)

(73) Assignee: GUANGZHOU AUTOMOBILE GROUP CO., LTD., Guangzhou (CN)

( * ) Notice: Subject to any disclaimer, the term of this patent is extended or adjusted under 35 U.S.C. 154(b) by 200 days.

(21) Appl. No.: 16/326,379

(22) PCT Filed: Nov. 23, 2017

(86) PCT No.: PCT/CN2017/112535
§ 371 (c)(1),
(2) Date: Feb. 19, 2019

(87) PCT Pub. No.: WO2018/095348
PCT Pub. Date: May 31, 2018

(65) Prior Publication Data
US 2019/0272014 A1 Sep. 5, 2019

(30) Foreign Application Priority Data
Nov. 24, 2016 (CN) .......................... 201611041248.8

(51) Int. Cl.
*G06F 1/3206* (2019.01)
*B60R 16/03* (2006.01)
(Continued)

(52) U.S. Cl.
CPC ............ *G06F 1/3206* (2013.01); *B60R 16/03* (2013.01); *G06F 1/3243* (2013.01);
(Continued)

(58) Field of Classification Search
CPC .... G06F 1/3206; G06F 1/3243; G06F 1/3287; G06F 13/124
See application file for complete search history.

(56) References Cited

U.S. PATENT DOCUMENTS

| 5,421,027 A * | 5/1995 | Benzel ................... G06F 13/24 |
| | | 713/323 |
| 6,601,178 B1 * | 7/2003 | Gulick .................. G06F 13/405 |
| | | 713/322 |

(Continued)

*Primary Examiner* — Jaweed A Abbaszadeh
*Assistant Examiner* — Gayathri Sampath
(74) *Attorney, Agent, or Firm* — ScienBiziP, P.C.

(57) ABSTRACT

A wake-up control method for a Body Control Module (BCM) includes: step S1 writing IDs and wake-up level information of all Micro Controller Unit (MCU) pins serving as an external wake-up source to a retention RAM; step S2, setting a wake-up detection timer, and triggering a system to enter a low power consumption mode; step S3, after a wake-up detection time set by the wake-up detection timer expires, enabling power supply to all MCU pins, setting the corresponding MCU pin as an input pin according to the pin ID information written in step S1, and acquiring level information of the input pin; and step S4, comparing the level information of the input pin with the wake-up level information written in step S1, if they are consistent, writing the ID of the input pin that is to serve as a wake-up source to the retention RAM and triggering the system to enter a normal operating mode, and if they are inconsistent, disabling the power supply to the MCU pin. A wake-up control device for a BCM is further provided. The wake-up control method and the wake-up control device for a BCM reduce selection requirements for MCU chips, and provide more flexible hardware pin allocation and design for a wake-up source.

11 Claims, 2 Drawing Sheets

(51) Int. Cl.
    *G06F 1/3234*     (2019.01)
    *G06F 1/3287*     (2019.01)
    *G06F 13/12*     (2006.01)
    *B60R 16/023*     (2006.01)

(52) U.S. Cl.
    CPC .......... *G06F 1/3287* (2013.01); *G06F 13/124* (2013.01); *B60R 16/0231* (2013.01); *Y02T 10/92* (2013.01)

(56) References Cited

U.S. PATENT DOCUMENTS

| | | | | |
|---|---|---|---|---|
| 6,826,701 | B1 * | 11/2004 | Plante | G06F 1/3203 |
| | | | | 713/300 |
| 2006/0212679 | A1 * | 9/2006 | Alfano | G06F 13/385 |
| | | | | 712/38 |
| 2009/0153211 | A1 * | 6/2009 | Hendin | G06F 1/3287 |
| | | | | 327/198 |
| 2009/0204834 | A1 * | 8/2009 | Hendin | G06F 1/3287 |
| | | | | 713/323 |
| 2011/0080269 | A1 | 4/2011 | Wagner | |
| 2014/0075066 | A1 * | 3/2014 | Menard | G06F 1/3243 |
| | | | | 710/104 |

* cited by examiner

WAKE-UP CONTROL METHOD AND DEVICE FOR BODY CONTROL MODULE

The present application claims benefit of Chinese Patent Application No. 201611041248.8, filed to the China Patent Office on Nov. 24, 2016, entitled "Wake-up Control Method and Device for Body Control Module", the contents of which are hereby incorporated by reference in its entirety.

TECHNICAL FIELD

The present disclosure relates to the technical field of vehicles, and more particularly to a wake-up control method and device for a Body Control Module (BCM).

BACKGROUND

A BCM is the most relevant controller for user interaction on a body system. For example, the functions of devices such as doors, wipers and lamps are all controlled by the BCM, so the BCM itself requires a lot of external input wake-up sources.

The external input wake-up source is generally implemented in hardware. That is, some pins are designed to support an external input wake-up function when a Micro Controller Unit (MCU) is designed. Before the system hibernates, a relevant pin with a wake-up function must be set to a wake-up function mode.

However, the MCU generally has a limited number of pins with the wake-up function. When the number of external wake-up sources of the system is more than the number of pins with the wake-up function of the MCU, the demand cannot be met, and a chip must be replaced. On the other hand, as the pin of the wake-up source must be powered during hibernation, and the output state of the pin cannot be flexibly controlled during the hibernation.

SUMMARY

In the embodiments of the present disclosure, a wake-up control method and device for a BCM are provided, which can more flexibly allocate hardware pins as wake-up sources and reduce the chip selection requirements of an MCU.

according to an embodiment of the present disclosure, a wake-up control method for a BCM is provided, which may include the steps as follows.

At step S1, IDs and wake-up level information of all MCU pins serving as an external wake-up source are written to a retention RAM.

At step S2, a wake-up detection timer is set, and a system is triggered to enter a low power consumption mode.

At step S3, after a wake-up detection time set by the wake-up detection timer expires, power supply is enabled to all MCU pins, the corresponding MCU pin is set as an input pin according to the pin ID information written in step S1 and level information of the input pin is acquired.

At step S4, the level information of the input pin is compared with the wake-up level information written in step S1, if they are consistent, the ID of the input pin that is to serve as a wake-up source is written to the retention RAM and the system is triggered to enter a normal operating mode, and if they are inconsistent, the power supply is disabled to the MCU pin.

In an embodiment, the wake-up level information may include high level, low level and edge change information of the pin.

In an embodiment, in step S4, if the power supply is disabled to the MCU pin, step S2 to step S4 may be restarted.

In an embodiment, the Step S3 may further include that: after power supply is enabled to all MCU pins, an output level of a pin not serving as an external input wake-up source is set.

In an embodiment, the time set by the wake-up detection timer may be on the order of ten milliseconds.

According to another embodiment of the present disclosure, a wake-up control device for a BCM is also provided, which may include:

a writing unit, configured to write IDs and wake-up level information of all MCU pins serving as an external wake-up source to a retention RAM;

a wake-up detection timer, configured to set a wake-up detection time, and trigger a system to enter a low power consumption mode; and a control unit, configured to enable, after the wake-up detection time set by the wake-up detection timer expires, power supply to all MCU pins, set the corresponding MCU pin as an input pin according to the pin ID information written by the writing unit, acquire level information of the input pin, compare the level information of the input pin with the wake-up level information written by the writing unit, write the ID of the input pin that is to serve as a wake-up source to the retention RAM and trigger the system to enter a normal operating mode if they are consistent, and disable the power supply to the MCU pin if they are inconsistent.

In an embodiment, the wake-up level information may include high level, low level and edge change information of the pin.

In an embodiment, if the control unit disables the power supply to the MCU pin, the wake-up detection timer may reset a wake-up detection time, and after the reset wake-up detection time expires, the control unit may perform the corresponding functions.

In an embodiment, the control unit may be further configured to set, after enabling power supply to all MCU pins, an output level of a pin not serving as an external input wake-up source.

In an embodiment, the wake-up detection time set by the wake-up detection timer may be on the order of ten milliseconds.

Correspondingly, according to another aspect of the embodiment of the present disclosure, a wake-up control method for a BCM is also provided, which may include the steps as follows.

At step S1 IDs and wake-up level information of all MCU pins serving as an external wake-up source are written to a retention RAM, the wake-up level information including high level, low level and edge change information of the pin.

At step S2, a wake-up detection timer is set, and a system is triggered to enter a low power consumption mode.

At step S3, after a wake-up detection time set by the wake-up detection timer expires, power supply is enabled to all MCU pins, the corresponding MCU pin is set as an input pin according to the pin ID information written in step S1 and level information of the input pin is acquired.

At step S4, the level information of the input pin is compared with the wake-up level information written in step S1, if they are consistent, the ID of the input pin that is to serve as a wake-up source is written to the retention RAM and the system is triggered to enter a normal operating mode, and if they are inconsistent, the power supply is disabled to the MCU pin.

In an embodiment, in step S4, if the power supply is disabled to the MCU pin, step S2 to step S4 may be restarted.

In an embodiment, the Step S3 may further include that: after power supply is enabled to all MCU pins, an output level of a pin not serving as an external input wake-up source is set.

In an embodiment, the time set by the wake-up detection timer may be on the order of ten milliseconds.

The beneficial effects of the above embodiments of the present disclosure are as follows.

For a pin serving as an external input wake-up source, there is no requirement for necessarily supporting a wake-up source function, and a normal input pin can be used, so the number of external input wake-up sources that can be supported by an MCU is up to the total number of pins of the MCU, and the number is much larger than the number of wake-up function pins of the MCU. Therefore, the chip selection requirements for the MCU for the wake-up function are greatly reduced. The hardware pin allocation for the wake-up source is more flexible, multiple paths of wake-up sources can be supported, the design of the wake-up source is more flexible, and high-speed correspondence can be realized.

Power supply may not be enabled to the wake-up source pin during hibernation, and is enabled only when wake-up detection conditions are triggered, an output level of the pin can be flexibly controlled during a low power consumption process, and power supply to the pin corresponding to the external input wake-up source can even be disabled.

BRIEF DESCRIPTION OF THE DRAWINGS

In order to more clearly illustrate the embodiments of the present disclosure or the technical solutions in the conventional art, the drawings used in the description of the embodiments or the conventional art will be briefly described below. It is apparent that the drawings in the following description are only some embodiments of the present disclosure, and other drawings can be obtained from those skilled in the art according to these drawings without any creative work.

DETAILED DESCRIPTION OF THE EMBODIMENTS

The following description of various embodiments is provided to illustrate implementable specific embodiments of the present disclosure with reference to the drawings.

Figure 1:
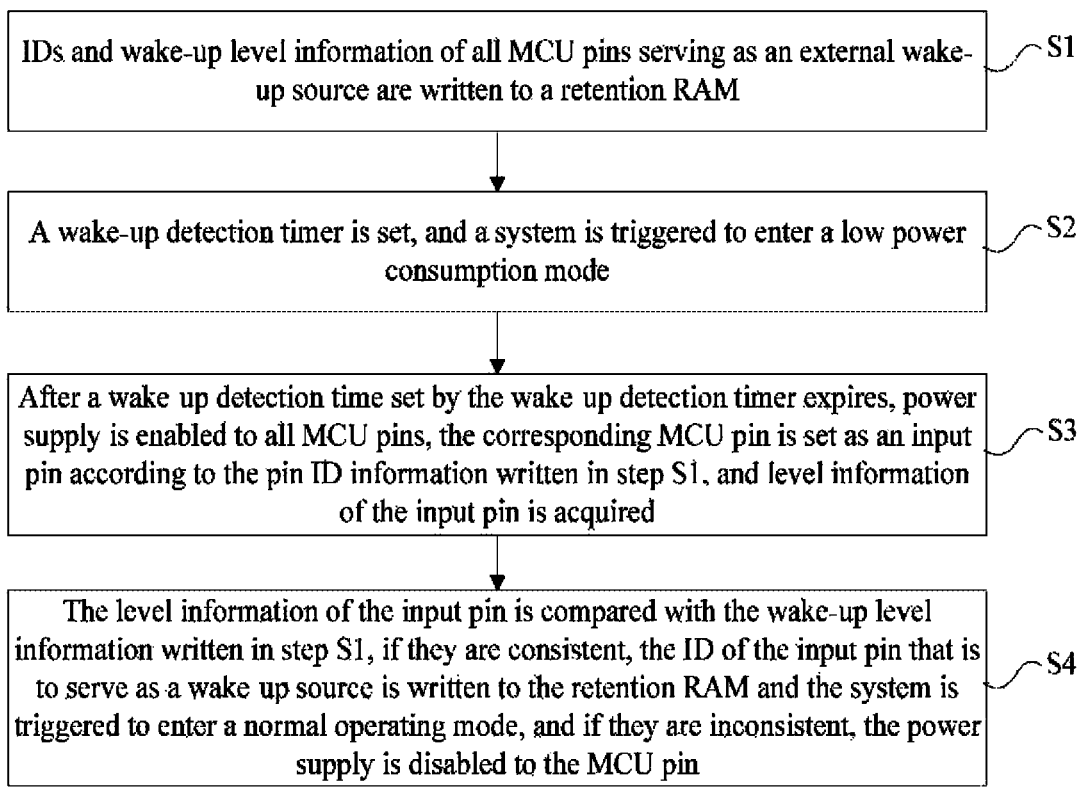
FIG. 1 is a flowchart of a wake-up control method for a BCM according to Embodiment 1 of the present disclosure.

Referring to FIG. 1, Embodiment 1 of the present disclosure provides a wake-up control method for a BCM, which includes the steps as follows.

At step S1, IDs and wake-up level information of all MCU pins serving as an external wake-up source are written to a retention RAM.

At step S2, a wake-up detection timer is set, and a system is triggered to enter a low power consumption mode.

At step S3, after a wake-up detection time set by the wake-up detection timer expires, power supply is enabled to all MCU pins, the corresponding MCU pin is set as an input pin according to the pin ID information written in step S1, and level information of the input pin is acquired.

At step S4, the level information of the input pin is compared with the wake-up level information written in step S1, if they are consistent, the ID of the input pin that is to serve as a wake-up source is written to the retention RAM and the system is triggered to enter a normal operating mode, and if they are inconsistent, the power supply is disabled to the MCU pin.

Figure 2:
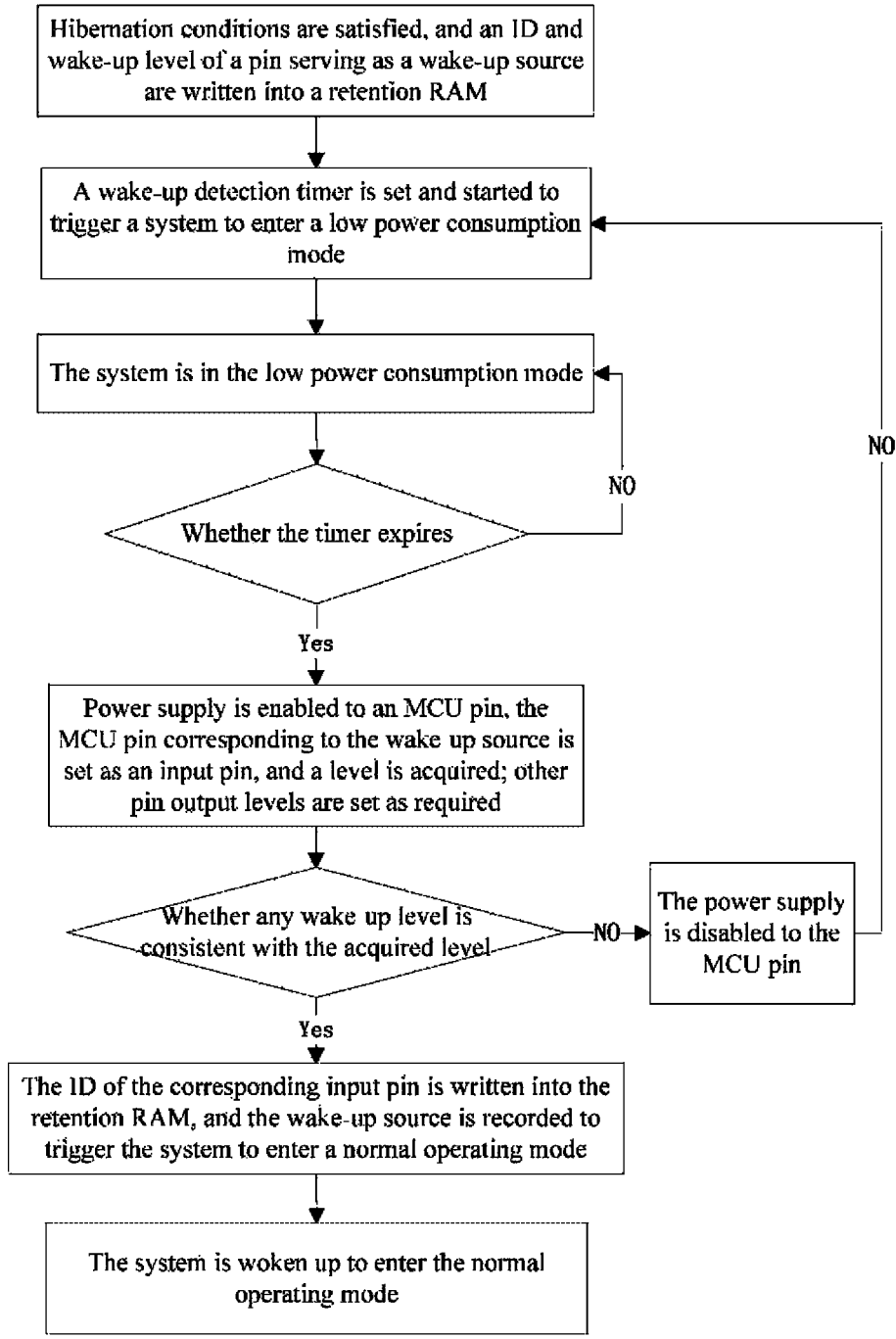
FIG. 2 is a specific flowchart of a wake-up control method for a BCM according to Embodiment 1 of the present disclosure.

The present embodiment will be specifically described below with reference to FIG. 2.

Step S1 is a pre-hibernation preparation step. Before the system hibernates, IDs and wake-up level information of all pins serving as an external wake-up source are written to a retention RAM. The wake-up level information includes high level, low level and edge change information of the pin, used as a judgment condition for subsequent wake-up detection.

At step S2, a timer is set and started to trigger a system to enter a low power consumption mode. The purpose is to make hardware work intermittently to check whether a pin level state satisfies the wakeup condition, that is, whether it is consistent with the setting condition of step S1, and if so, it is indicated that there is a wake-up event. In an implementation manner, a hardware timer that can work in a low power consumption mode, can be provided on an MCU, or can be replaced with other functional modules that can set a certain time interval to wake the system up. In the present embodiment, the wake-up detection time set by the timer is on the order of ten milliseconds, usually several tens of milliseconds.

In step S3, the triggering timing of wake-up detection is that the wake-up detection time set by the timer expires. After the time expires, power supply is, enabled to all MCU pins, the pin ID information written in step S1 is acquired from the retention RAM, the corresponding MCU pin is set as an input pin, and level information of the input pin is acquired. Since the pin ID written in step S1 corresponds to the pin serving as the external wake-up source, the input pin here is also the pin serving as the external wake-up source.

In step S4, the level information of the input pin acquired in step S3 is compared with the wake-up level information written in step S1, if they are consistent, it is indicated that there is an external wake-up event for the input pin currently, the ID of the input pin that is to serve as a wake-up source is written to the retention RAM and the system is triggered to enter a normal operating mode to complete system wake-up; since there are multiple input pins, if the level information of each input pin is inconsistent with the corresponding wake-up level information written in step S1, that is, there is no matching pin level information, the power supply is disabled to the MCU pin.

It is to be noted that if the level information of each input pin is inconsistent with the corresponding wake-up level information written in step S1, it is indicated that there is no external wake-up event currently, it should return to step S2 to reset and start the timer to trigger the system to enter a hibernation mode, which is in the loop of hibernation and detection.

In addition, step S3 of the present embodiment further includes that: after power supply is enabled to all MCU pins, an output level of a pin not serving as an external input wake-up source is set. For example, the power supply of a portion of circuits of some peripherals or chips may be designed. A pin (assumed to be GJ1) is used to control whether the path of power supply (assumed to be DY1) is adopted, the pin may be controlled to turn off unnecessary power supplies before hibernation, and when the timer expires for wake-up detection, the pin GJ1 is controlled to turn on the corresponding power supply DY1. In general, during the hibernation process of the system, the level change of the pin cannot be actively controlled unless it is triggered by an external event.

Corresponding to Embodiment 1 of the present invention, Embodiment 2 of the present disclosure provides a wake-up control device for a BCM, which. includes a writing unit, a wake-up detection timer and a control unit.

The writing unit is configured to write IDs and wake-up level information of all MCU pins serving as an external wake-up source to a retention RAM.

The wake-up detection timer is configured to set a wake-up detection time, and trigger a system to enter a low power consumption mode.

The control unit is configured to enable, after the wake-up detection time set by the wake-up detection timer expires, power supply to all MCU pins, set the corresponding MCU pin as an input pin according to the pin ID information written by the writing unit, acquire level information of the input pin, compare the level information of the input pin with the wake-up level information written by the writing unit, write the ID of the input pin that is to serve as a wake-up source to the retention RAM and trigger the system to enter a normal operating mode if they are consistent, and disable the power supply to the MCU pin if they are inconsistent.

The wake-up level information includes high level, low level and edge change information of the pin.

If the control unit disables the power supply to the MCU pin, the wake-up detection timer resets a wake-up detection time, and after the reset wake-up detection time expires, the control unit performs the corresponding functions.

The control unit is further configured to set, after enabling power supply to all MCU pins, an output level of a pin not serving as an external input wake-up source.

The wake-up detection time set by the wake-up detection timer is on the order of ten milliseconds.

As can be seen from the above description, the beneficial effects of implementing the present disclosure are as follows.

For a pin serving as an external input wake-up source, there is no requirement for necessarily supporting a wake-up source function, and a normal input pin can be used, so the number of external input wake-up sources that can be supported by an IMCU is up to the total number of pins of the MCU, and the number is much larger than the number of wake-up function pins of the MCU. Therefore, the chip selection requirements for the MCU for the wake-up function are greatly reduced. The hardware pin allocation for the wake-up source is more flexible, multiple paths of wake-up sources can be supported, the design of the wake-up source is more flexible, and high-speed correspondence can be realized.

Power supply may not be enabled to the wake-up source pin during hibernation, and is enabled only when wake-up detection conditions are triggered, an output level of the pin can be flexibly controlled during a low power consumption process, and power supply to the pin corresponding to the external input wake-up source can even be disabled.

The above is only the preferred embodiments of the present disclosure, the scope of the present disclosure is not limited thereto, and thus equivalent changes made in the claims of the present disclosure are still within the scope of the present disclosure.

What is claimed is:

1. A wake-up control method for a Body Control Module (BCM), comprising:
   step S1, writing IDs and wake-up level information of all Micro Controller Unit (MCU) pins of a MCU serving as external wake-up sources of the BCM to a retention RAM;
   step S2, setting a wake-up detection timer, and triggering a system to enter a low power consumption mode;
   step S3, after a wake-up detection time set by the wake-up detection timer expires, enabling power supply to all MCU pins of the MCU, setting all the MCU pins serving as external wake-up sources as input pins according to the IDs written in step S1, and acquiring level information of the input pins; and
   step S4, for each input pin, comparing the level information of the input pin with the wake-up level information of the input pin, if the level information of the input pin and the wake-up level information of the input pin are consistent, writing the ID of the input pin to the retention RAM to indicate that there is an external wake-up event for the input pin currently and triggering the system to enter a normal operating mode, and if there is no input pin whose level information and wake-up level information are consistent, disabling the power supply to all the MCU pins of the MCU.

2. The method as claimed in claim 1, wherein the wake-up level information comprises high level, low level and edge change information.

3. The method as claimed in claim 1, wherein if the power supply is disabled to all the MCU pins of the MCU in step S4, step S2 to step S4 are restarted.

4. The method as claimed in claim 1, wherein Step S3 further comprises: after power supply is enabled to all MCU pins of the MCU, setting an output level of a pin of the MCU which is not serving as the external wake-up source.

5. The method as claimed in claim 1, wherein the time set by the wake-up detection timer is on the order of ten milliseconds.

6. The method as claimed in claim 2, wherein the time set by the wake-up detection timer is on the order of ten milliseconds.

7. The method as claimed in claim 3, wherein the time set by the wake-up detection timer is on the order of ten milliseconds.

8. The method as claimed in claim 4, wherein the time set by the wake-up detection timer is on the order of ten milliseconds.

9. A wake-up method for a Body Control Module (BCM), comprising:
   step S1, writing IDs and wake-up level information of all Micro Controller Unit (MCU) pins of a MCU serving as external wake-up sources of the BCM to a retention RAM, the wake-up level information comprising high level, low level and edge change information;
   step S2, setting a wake-up detection timer, and triggering a system to enter a low power consumption mode;
   step S3, after a wake-up detection time set by the wake-up detection timer expires, enabling power supply to all MCU pins of the MCU, setting all the MCU pins serving as external wake-up sources as input pins according to the IDs written in step S1, and acquiring level information of the input pins; and
   step S4, for each input pin, comparing the level information of the input pin with the wake-up level information of the input pin, if the level information of the input pin and the wake-up level information of the input pin are consistent, writing the ID of the input pin to the retention RAM to indicate that there is an external wake-up event for the input pin currently and triggering the system to enter a normal operating mode, and if there is no input pin whose level information and wake-up level information are consistent, disabling the power supply to all the MCU pins of the MCU, wherein if the power supply is disabled to all the MCU pins of the MCU in step S4, step S2 to step S4 are restarted.

10. The method as claimed in claim 9, wherein Step S3 further comprises: after power supply is enabled to all MCU pins of the MCU, setting an output level of a pin of the MCU which is not serving as the external wake-up source.

11. The method as claimed in claim 10, wherein the time set by the wake-up detection timer is on the order of ten milliseconds.

\* \* \* \* \*